(No Model.) 3 Sheets—Sheet 1.
J. P. H. GASTRELL.
FASTENER FOR THE MEETING RAILS OF SASHES.
No. 489,735. Patented Jan. 10, 1893.
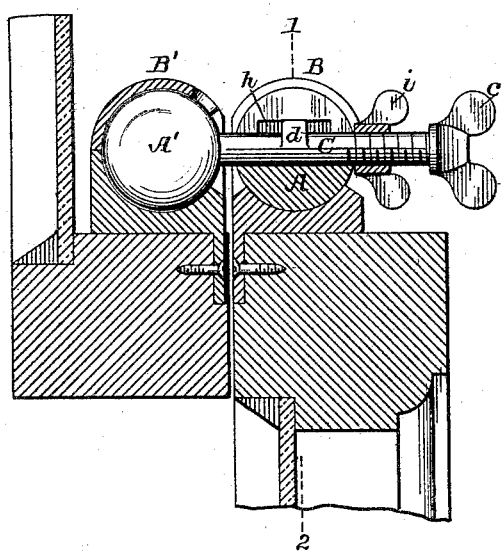
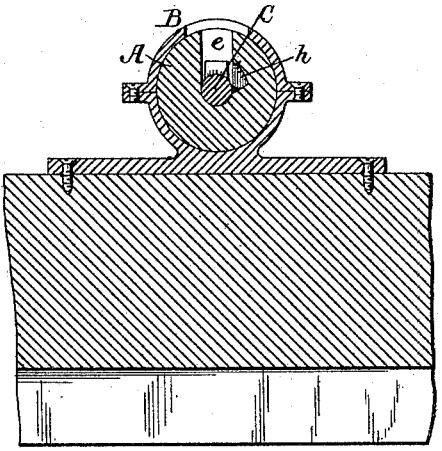
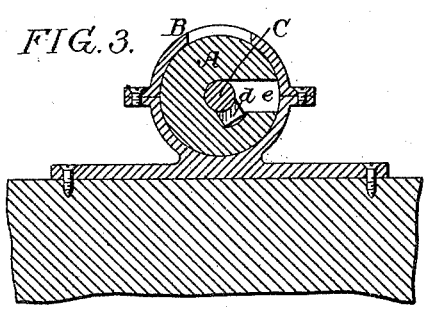
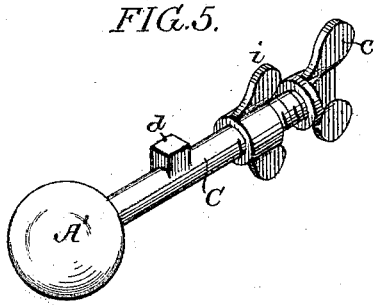
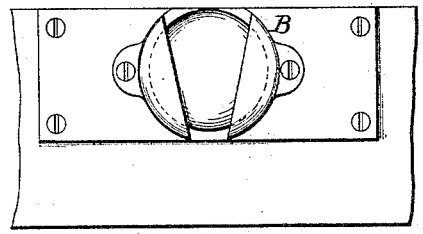
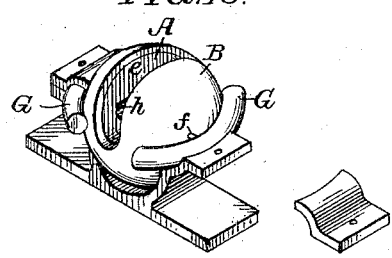
Witnesses:
R. Schleicher.
Alex. Barkoff
Inventor:
James P. H. Gastrell
by his Attorneys
Howson & Howson (No Model.) 3 Sheets—Sheet 2.

J. P. H. GASTRELL.
FASTENER FOR THE MEETING RAILS OF SASHES.

No. 489,735. Patented Jan. 10, 1893.

Witnesses:
R. Schleicher
Alex. Barkoff

Inventor:
James P. H. Gastrell
by his Attorneys
Howson & Howson (No Model.) 3 Sheets—Sheet 3.
J. P. H. GASTRELL.
FASTENER FOR THE MEETING RAILS OF SASHES.
No. 489,735. Patented Jan. 10, 1893.
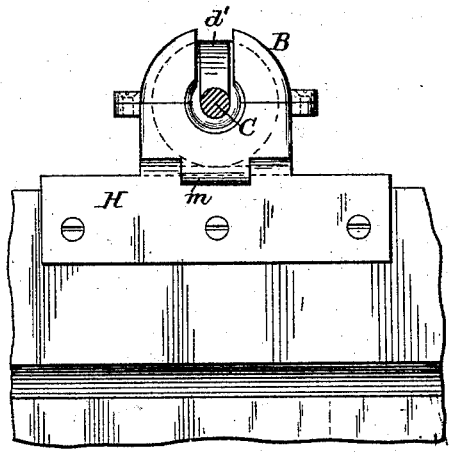
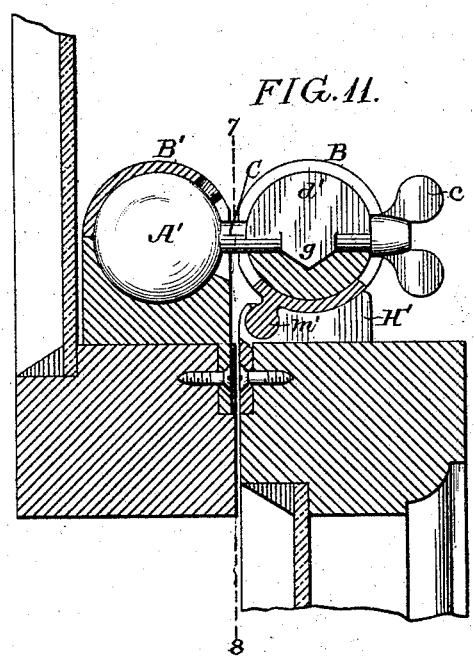
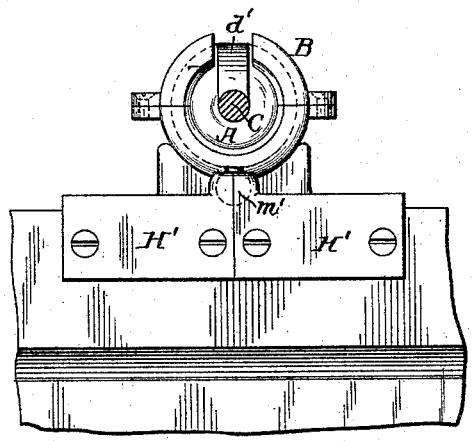
Witnesses:
R. Schleicher
Alex. Barkoff
Inventor:
James P. H. Gastrell
by his Attorneys
Howson & Howson

UNITED STATES PATENT OFFICE.

JAMES P. H. GASTRELL, OF WIESBADEN, GERMANY.

FASTENER FOR THE MEETING-RAILS OF SASHES.

SPECIFICATION forming part of Letters Patent No. 489,735, dated January 10, 1893.

Application filed April 21, 1892. Serial No. 430,075. (No model.)

*To all whom it may concern:*

Be it known that I, JAMES PLAISTER HARRIS GASTRELL, a subject of the Queen of Great Britain and Ireland, domiciled in Nassau, Germany, and residing therein at 2 Theodoren Strasse, Wiesbaden, but temporarily a resident of the United States, at 48 Bowdoin street, Boston, Massachusetts, have invented certain Improvements in Fasteners for Meeting-Rails of Sashes, of which the following is a specification.

My invention relates to certain improvements in that class of fasteners for meeting rails of sashes described in my application for Letters Patent filed June 13, 1891, Serial No. 396,117, its object being to simplify and improve the construction of the fastening devices described in said application.

Figure 6:
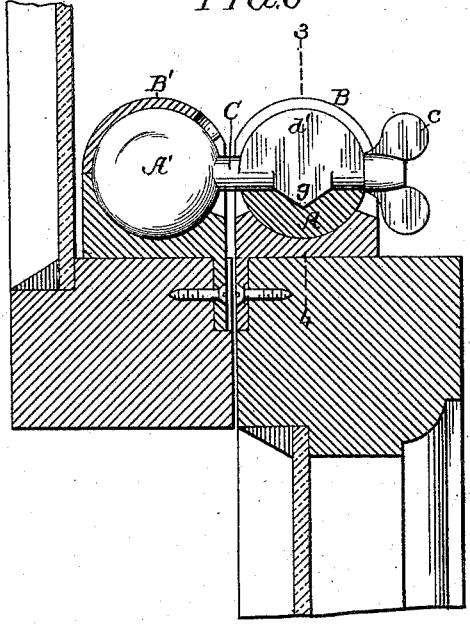
Figure 7:
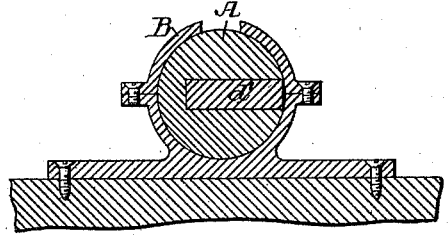
Figure 8:
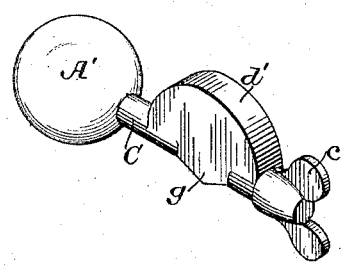
Figure 9:
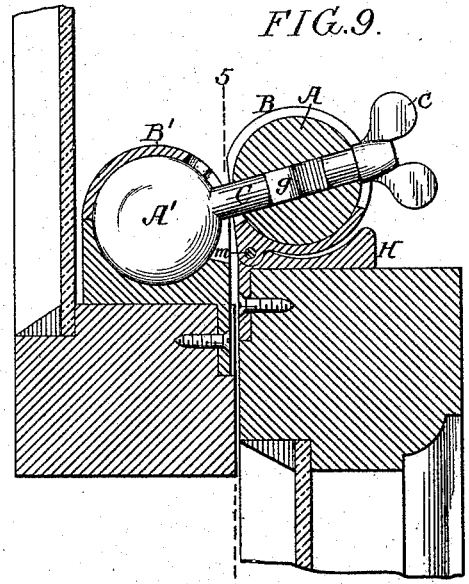

In the accompanying drawings:—Figure 1, is a sectional view of one form of fastening device; Fig. 2, is a sectional view of the same on the line 1—2, Fig. 1; Fig. 3, is a view similar to Fig. 2, with the parts in a different position; Fig. 4, is a plan view of Fig. 3; Fig. 5, is a perspective view of the locking bolt; Fig. 6, is a sectional view corresponding to Fig. 1, and illustrating a different form of receiving sleeve and bolt; Fig. 7, is a sectional view on the line 3—4, Fig. 6, with the parts in a different position from that illustrated in Fig. 6; Fig. 8, is a perspective view of the locking bolt illustrated in Figs. 6 and 7; Fig. 9, is a sectional view illustrating one manner in which vertical deviation of the sashes may be provided for; Fig. 10, is a sectional view on the line 5—6, Fig. 9, showing the parts in a different position; Fig. 11, is a sectional view showing another manner for providing for both vertical and lateral deviation of the sashes; Fig. 12, is a sectional view on the line 7—8, Fig. 11; and Fig. 13, is a perspective view of a further modification.

The improvement described in the hereinbefore mentioned application comprises in general two or more spherical blocks having universal circular bearings and passages for the reception of a locking bolt, the blocks and their bearings being so arranged in relation to each other that a bolt can be employed to lock the two together even though they deviated to a considerable extent.

My present invention consists in securing together the bolt and one of the spheres or blocks or making them in one piece, and in providing in the upper side of the other and receiving sphere or block, a slot extending from its circumference to its diameter.

As the invention is particularly applicable to the meeting rails of window sashes, I will describe it as applied to this use, although it will, of course, be understood that it may be employed for any purpose where two parts are to be locked together and in every case where a bolt can be employed.

As applied to a sash fastening this improvement takes the following form:—On the upper or outer sash I fasten a universal bearing B' and place therein the spherical block A' which forms an integral part of, or is firmly secured to, the locking bolt C, the bolt acting as its own stop and with sufficient play for deviation in every direction to the edge of the opening in the universal bearing. At the end of this bolt is a thumb plate *c* and at the needed distance on the bolt is centered, at the normal locking end of the bolt and at the center of the receiving sphere A, a feather or winged piece *d*, preferably of the same section as the slot *e* in the receiving sphere A, the bolt being preferably circular in cross section and when in locking position lying evenly along the diameter of the receiving sphere.

With reference to Figs. 1 to 5 inclusive, B represents a bearing block permanently secured to the upper edge of the inner sash and containing a slotted sphere A, the slot *e* in which extends in a radial line from the circumference to a diameter, and, by preference, one side of the slot is undercut as at *h* for a purpose hereinafter described. The upper face of the receiving sleeve B is cut away so as to expose the slot *e* and the edges of the opening thus formed are at an acute angle so as to provide for considerable deviation of the parts in locking. Along the length of the bolt is a feather or winged piece *d*, as more clearly shown in Fig. 4, and the parts are so constructed and arranged with reference to each other that when the slot *e* is in a vertical line and is open the locking bolt C may be readily inserted therein, and, by a simple turn of the thumb plate *c* the wing or feather *d* is caused to engage with the undercut portion *h* and so turn the sphere A until its slot is out of line with the opening in the spherical bearing, as shown for instance in Fig. 3, and when the parts assume this position the sash will be effectually locked against any amount of force insufficient to rupture the parts. Where a considerable amount of deviation is to be provided for it is desirable that the undercut portion $h$ be of sufficient length to be engaged by the wing or feather $d$ under almost any conditions, and it is also desirable that the shank of the locking bolt be provided with a screw thread, as shown in Fig. 1, on which turns a thumb nut $i$, by operating which the sashes may be drawn tightly together and rattling or movement prevented.

In the construction illustrated in Figs. 6, 7 and 8, the parts are arranged in practically the same manner without allowing such a considerable amount of deviation of the parts and it will be observed that the wing or feather $d'$ is of a curved section and of a size to correspond to the slot $e$ in the receiving sphere A. On the underside of the bolt is a conical projection $g$ which fits into a correspondingly shaped recess in the sphere A and acts to center the bolt and the wing or feather and at the same time tends to draw the sashes together and prevent rattling. In this case also a quarter or half turn of the bolt locks the sleeves together. It will be noticed that the thumb plate $c$ is provided with a shoulder of such a nature that by its leverage on the outside of the spherical bearing block B it will tend to pull the sashes together and aid in the centering of the bolt.

Figs. 9 and 10 represent modifications of this device in which a considerable amount of vertical deviation of the sashes is provided for, the bearing block B in this case being hinged at $m$ to the block H so that the bearing is free to rise to permit any reasonable amount of vertical deviation.

Figs. 11 and 12, illustrate a further modification in which the bearing block B is provided with a ball $m'$ adapted to a correspondingly shaped recess in a base plate H', so that both vertical and lateral deviation of the parts is provided for; it will also be seen that a universal bearing, such for instance as that described in my above mentioned application, may be applied to this form of sleeve, as shown for instance in Fig. 12, in which the slotted sphere A is mounted within the sleeve B, which in turn is pivoted upon pins $f$ projecting from curved bars G suitably guided in bearings and so arranged that a free movement of the bearing is permitted.

Having thus described my invention, I claim and desire to secure by Letters Patent:—

1. A fastening device comprising in combination a pivoted bolt, a block having a radially extending slot to which said bolt is adapted, a bearing for said block, said bearing having an opening to permit engagement of the bolt with the block, and a projecting portion carried by said bolt and adapted to engage with the walls of the slot and turn the block, substantially as specified.

2. The combination of the pivoted bolt, a slotted spherical block with which said bolt is adapted to engage, said block having an undercut portion, a feather or wing on said bolt adapted to engage with said undercut portion, a bearing for said spherical block, said bearing having an opening to permit the engagement of the bolt with the slotted block, substantially as specified.

3. A fastening device comprising in combination a pivoted bolt, a spherical bearing block having a radially extending slot a projecting portion on the bolt adapted to enter the slot and engage with the walls thereof, a bearing for said spherical block having an opening to permit the engagement of the bolt with the block, a screw thread on said bolt, and a thumb nut whereby the parts may be locked together, substantially as specified.

4. The combination of the bearing B', a spherical block A' mounted in said bearing, a bolt carried by said spherical block, a bearing B, a spherical block A carried thereby and having a radially extending slot, said bolt having a wing or feather adapted to engage with the walls of the slot and turn the block A, substantially as specified.

5. The combination of the pivoted bolt, the wing or feather carried thereby, an inclined or conical projection on said bolt, a receiving sphere having a slotted portion and a recessed portion corresponding to the inclined projection on the bolt and a bearing for said receiving sphere having an opening to permit the engagement of the bolt with the receiving sphere, substantially as specified.

6. The combination of the bolt, a radially slotted receiving sphere, a bearing for said sphere, a pivot block secured to the sash and forming a pivot point and bearing for said sphere bearing, substantially as specified.

In testimony whereof I have signed my name to this specification in the presence of two subscribing witnesses.

JAMES P. H. GASTRELL.

Witnesses:
  BLANCHE I. BRACKETT,
  CHAS. HALL ADAMS.